United States Patent
Ishibashi

(10) Patent No.: US 11,102,435 B2
(45) Date of Patent: Aug. 24, 2021

(54) IMAGING DEVICE AND METHOD OF DRIVING IMAGING DEVICE

(71) Applicant: CANON KABUSHIKI KAISHA, Tokyo (JP)

(72) Inventor: Koji Ishibashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 223 days.

(21) Appl. No.: 16/016,062

(22) Filed: Jun. 22, 2018

(65) Prior Publication Data

US 2019/0007638 A1    Jan. 3, 2019

(30) Foreign Application Priority Data

Jun. 30, 2017 (JP) .............................. JP2017-129127

(51) Int. Cl.
| | |
|---|---|
| *H04N 5/378* | (2011.01) |
| *G06T 7/55* | (2017.01) |
| *H04N 5/374* | (2011.01) |
| *H04N 5/3745* | (2011.01) |
| *H04N 5/376* | (2011.01) |

(52) U.S. Cl.
CPC ............... *H04N 5/378* (2013.01); *G06T 7/55* (2017.01); *H04N 5/3742* (2013.01); *H04N 5/3745* (2013.01); *G06T 2207/30252* (2013.01); *H04N 5/3765* (2013.01)

(58) Field of Classification Search
CPC .............................. H04N 5/3745; H04N 5/378
See application file for complete search history.

(56) References Cited

U.S. PATENT DOCUMENTS

| | | | |
|---|---|---|---|
| 9,148,590 B2 | 9/2015 | Ishibashi | |
| 2005/0242849 A1* | 11/2005 | Muramatsu | H03K 23/56 327/151 |
| 2007/0023788 A1 | 2/2007 | Yasui | |
| 2007/0080376 A1* | 4/2007 | Adachi | H04N 5/3598 257/239 |
| 2009/0086067 A1 | 4/2009 | Araki | |
| 2009/0166513 A1 | 7/2009 | Abe | |
| 2009/0184236 A1* | 7/2009 | Kawaguchi | H04N 5/3742 250/208.1 |

(Continued)

FOREIGN PATENT DOCUMENTS

| | | |
|---|---|---|
| JP | 2007-36916 | 2/2007 |
| JP | 2009-88769 | 4/2009 |

(Continued)

*Primary Examiner* — Mainul Hasan
(74) *Attorney, Agent, or Firm* — Venable LLP

(57) ABSTRACT

An imaging device includes a pixel that outputs a signal based on charges generated by photoelectric conversion, a comparator that compares a pixel signal output from the pixel with a reference signal and outputs a signal in accordance with a comparison result, a buffer circuit that buffers a signal output from the comparator, a switch provided at least one of a part between the buffer circuit and a first node supplied with a first power source voltage and a part between the buffer circuit and a second node supplied with a second power source voltage, and a control circuit that controls the switch to a non-conductive state in a period in which the comparator performs a comparison operation to compare the pixel signal with the reference signal.

14 Claims, 11 Drawing Sheets

(56) References Cited

U.S. PATENT DOCUMENTS

| | | | |
|---|---|---|---|
| 2010/0194949 A1* | 8/2010 | Hisamatsu | H03M 1/20 |
| | | | 348/302 |
| 2011/0001039 A1* | 1/2011 | Hoshino | H04N 5/3742 |
| | | | 250/208.1 |
| 2011/0317051 A1 | 12/2011 | Abe | |
| 2012/0038804 A1 | 2/2012 | Araki | |
| 2013/0215303 A1* | 8/2013 | Ueno | H03K 5/2481 |
| | | | 348/300 |
| 2014/0293106 A1* | 10/2014 | Park | H04N 5/3591 |
| | | | 348/308 |
| 2015/0171884 A1* | 6/2015 | Tsukuda | H04N 5/378 |
| | | | 348/308 |
| 2015/0303937 A1* | 10/2015 | Gou | H03M 1/14 |
| | | | 250/208.1 |
| 2020/0053308 A1* | 2/2020 | Niwa | H03K 5/2481 |

FOREIGN PATENT DOCUMENTS

| | | |
|---|---|---|
| JP | 2009-159271 | 7/2009 |
| JP | 4978795 | 7/2012 |

\* cited by examiner

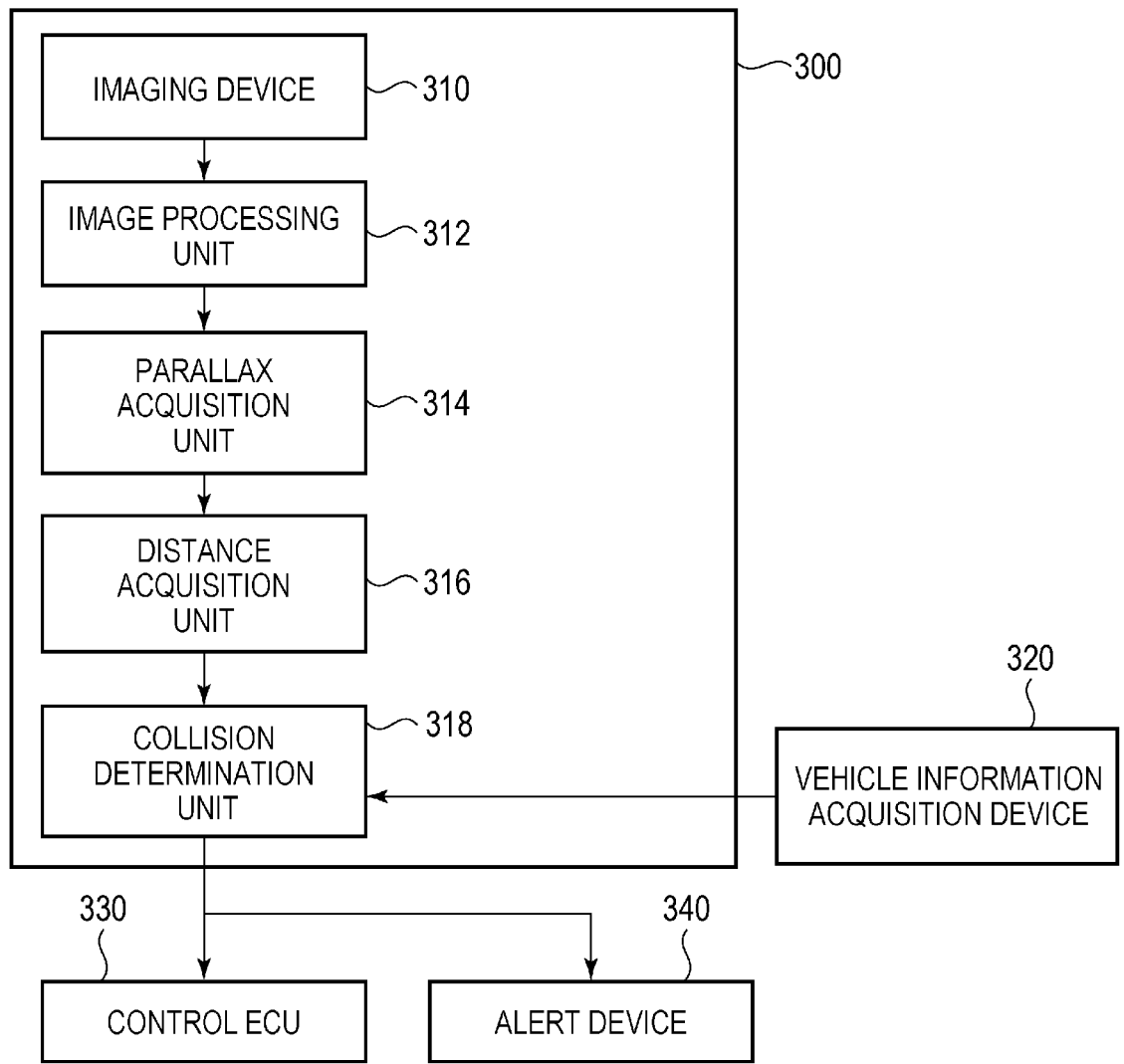
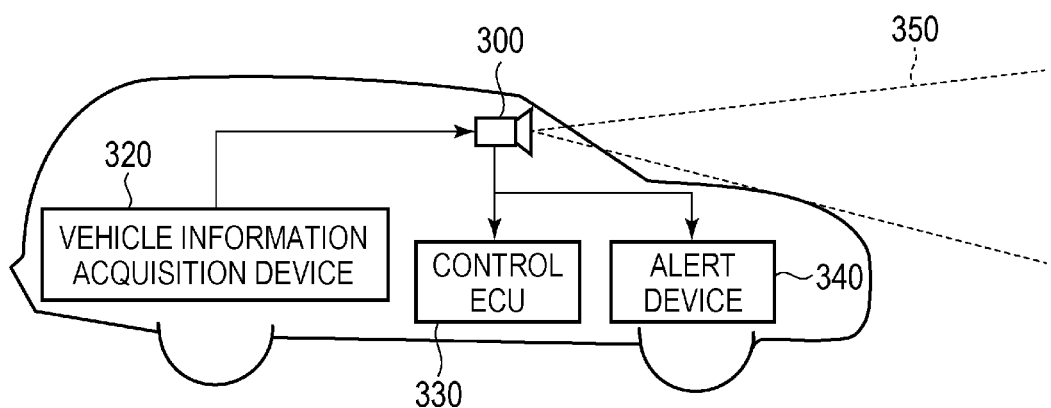

IMAGING DEVICE AND METHOD OF DRIVING IMAGING DEVICE

BACKGROUND OF THE INVENTION

Field of the Invention

The present invention relates to an imaging device and a method of driving the imaging device.

Description of the Related Art

An imaging device on which a column-parallel analog-to-digital (AD) converter having an AD conversion unit on each of a pixel column is mounted has been proposed. In a typical column-parallel AD converter, a reference signal whose level changes with time is compared with a pixel signal by a comparator, the time period from the start of comparison to inversion of an output signal of the comparator is counted, and thereby AD conversion of a pixel signal is performed.

In an imaging device on which such a column-parallel AD converter is mounted, it is demanded to suppress an increase of power consumption due to a through-current flowing in a comparator or a buffer circuit or deterioration of image quality due to current fluctuation. Japanese Patent No. 4978795 proposes an art of configuring a buffer circuit with a NAND circuit in order to prevent a through-current from flowing in a buffer circuit in the post-stage of the comparator when performing a reset operation of the comparator.

However, a through-current that occurs in the buffer circuit in the post-stage of the comparator may occur not only at a reset operation of the comparator but also at inversion of an output signal of the comparator. That is, when the slew rate at inversion of the output signal of the comparator is slow, a through-current may occur in the post-stage buffer circuit, and power consumption may increase. Further, current fluctuation at a power source node or a ground node due to occurrence of a through-current may cause noise and result in deterioration of image quality.

SUMMARY OF THE INVENTION

An object of the present invention is to provide an imaging device and a method of driving the same that can suppress an increase of power consumption or deterioration of image quality due to an operation of an AD conversion circuit.

According to one aspect of the present invention, there is provided an imaging device including a pixel that outputs a signal based on charges generated by photoelectric conversion, a comparator that compares a pixel signal output from the pixel with a reference signal and outputs a signal in accordance with a comparison result, a buffer circuit that buffers a signal output from the comparator, a switch provided at least one of a part between the buffer circuit and a first node supplied with a first power source voltage and a part between the buffer circuit and a second node supplied with a second power source voltage, and a control circuit that controls the switch to a non-conductive state in a period in which the comparator performs a comparison operation to compare the pixel signal with the reference signal.

Further, according to another aspect of the present invention, there is provided a method of driving an imaging device including a pixel that outputs a signal based on charges generated by photoelectric conversion, a comparator that compares a pixel signal output from the pixel with a reference signal and outputs a signal in accordance with a comparison result, and a buffer circuit that buffers a signal output from the comparator, the method including, when performing a comparison operation in which the comparator compares the pixel signal with the reference signal, in accordance with an output of the comparator before the comparison operation, controlling connection between the buffer circuit and a first node supplied with a first power source voltage or connection between the buffer circuit and a second node supplied with a second power source voltage to a non-conductive state.

Further features of the present invention will become apparent from the following description of exemplary embodiments with reference to the attached drawings.

BRIEF DESCRIPTION OF THE DRAWINGS

FIG. 11A is a diagram illustrating a configuration example of an imaging system according to a sixth embodiment.

FIG. 11B is a diagram illustrating a configuration example of a movable object of the sixth embodiment.

DESCRIPTION OF THE EMBODIMENTS

Preferred embodiments of the present invention will now be described in detail in accordance with the accompanying drawings.

First Embodiment

Figure 1:
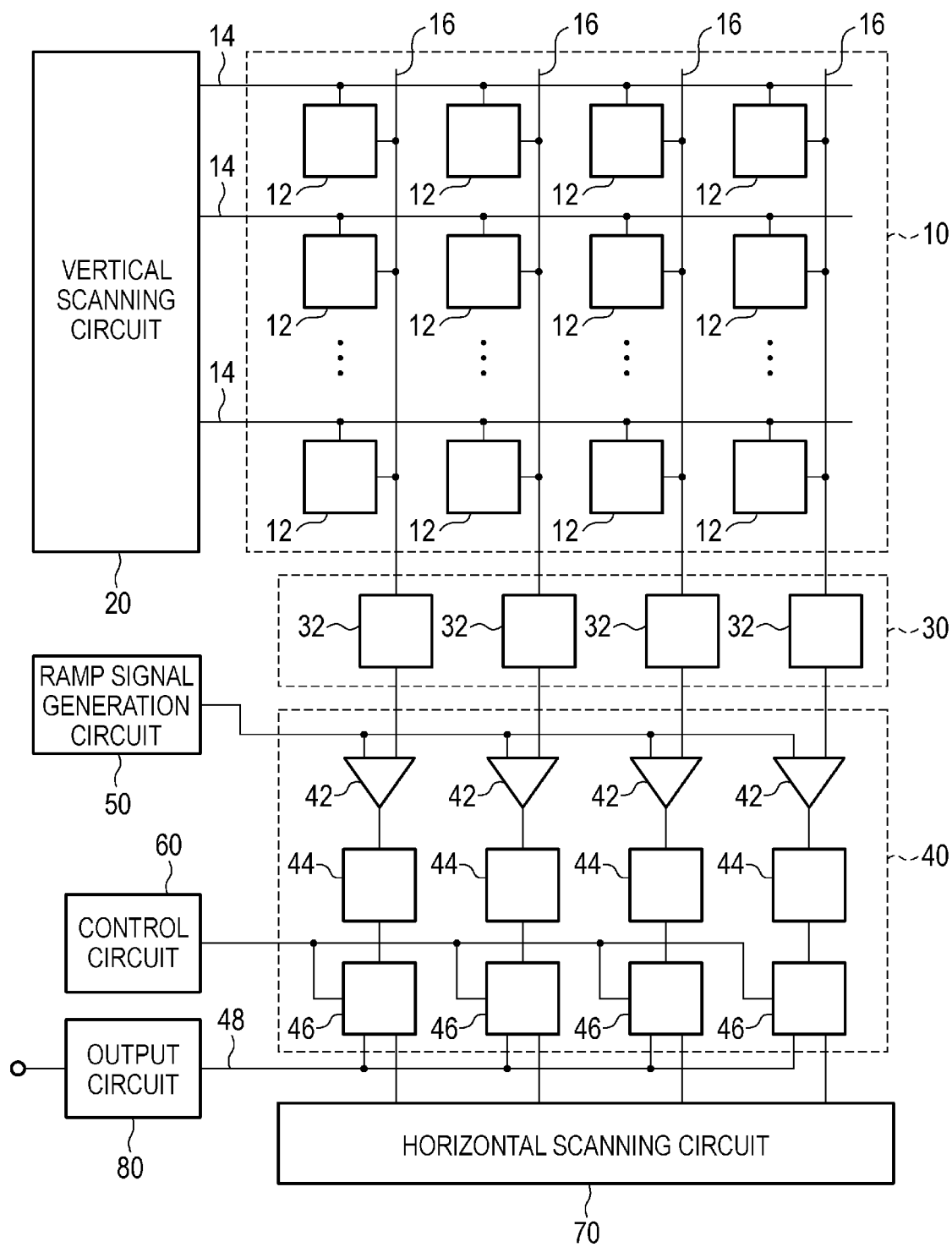
FIG. 1 is a block diagram illustrating a general configuration of an imaging device according to a first embodiment.
Figure 2:
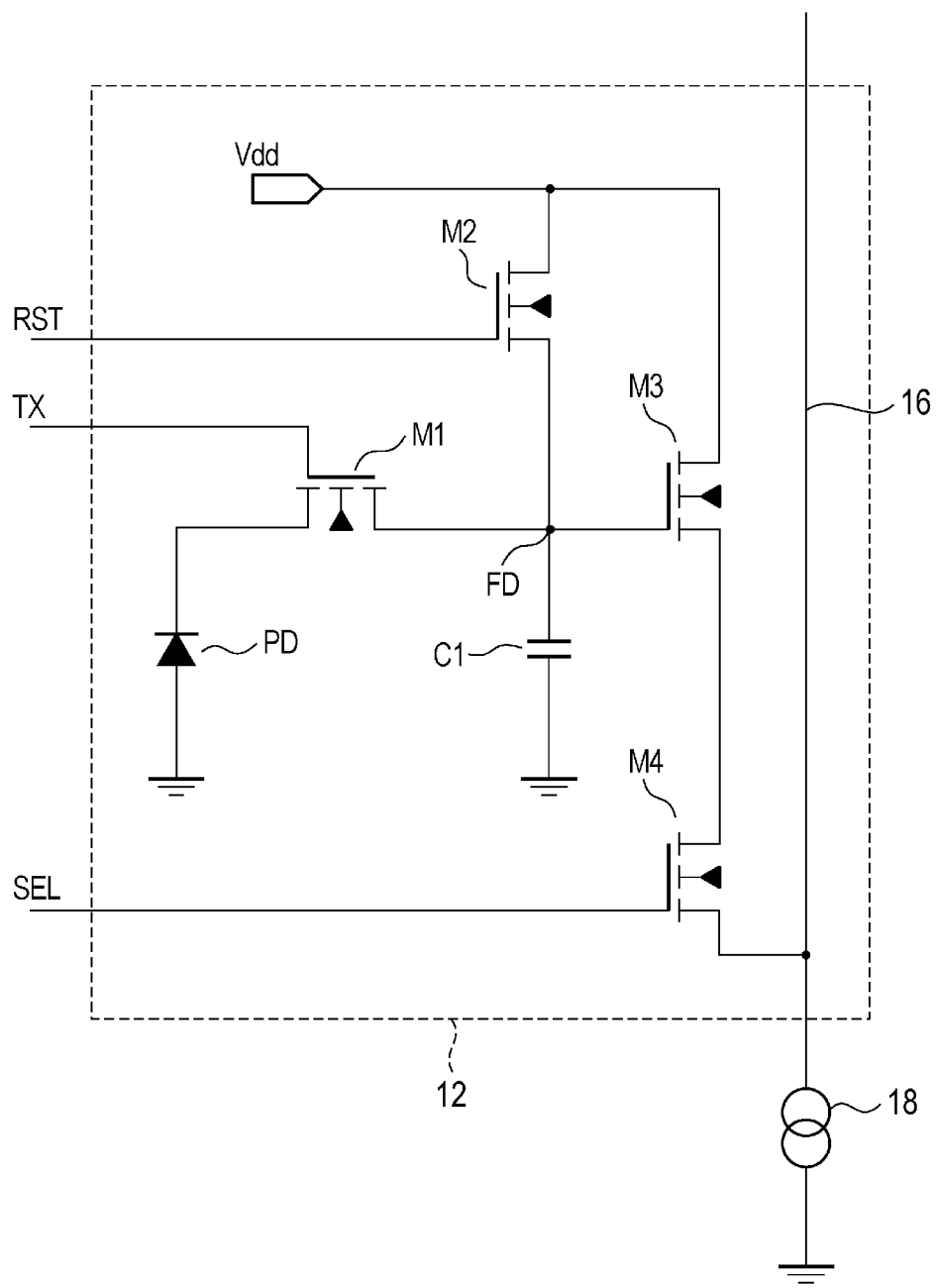
FIG. 2 is a circuit diagram illustrating a configuration example of a pixel in the imaging device according to the first embodiment.
Figure 3:
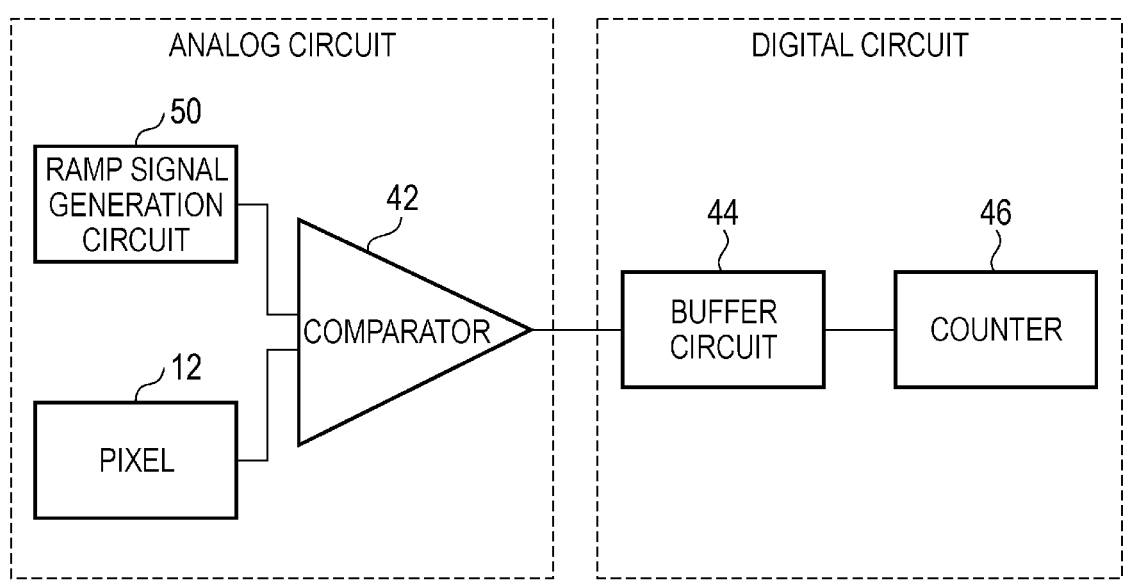
FIG. 3 is a schematic diagram illustrating a path on which a signal output from the pixel is input to a counter in the imaging device according to the first embodiment.
Figure 4A:
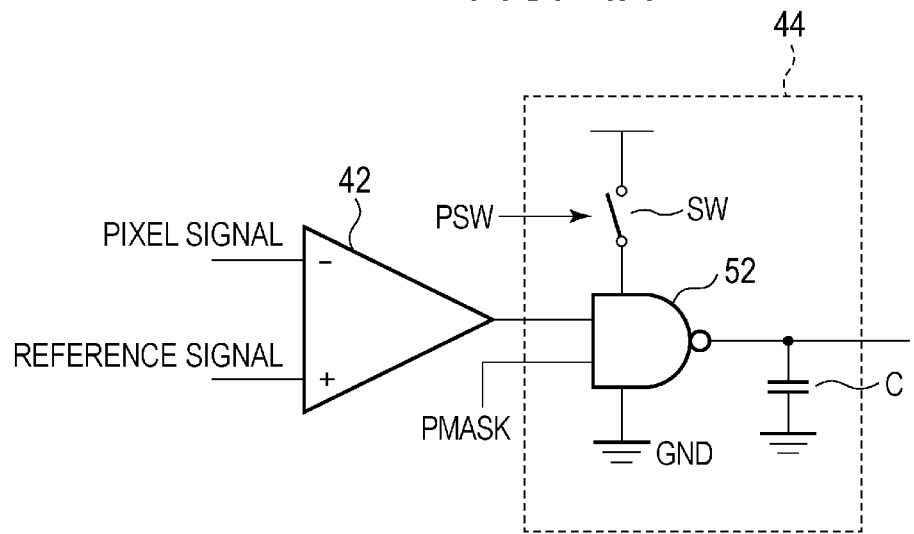
FIG. 4A is a diagram illustrating a specific configuration example of the imaging device according to the first embodiment.
Figure 4B:
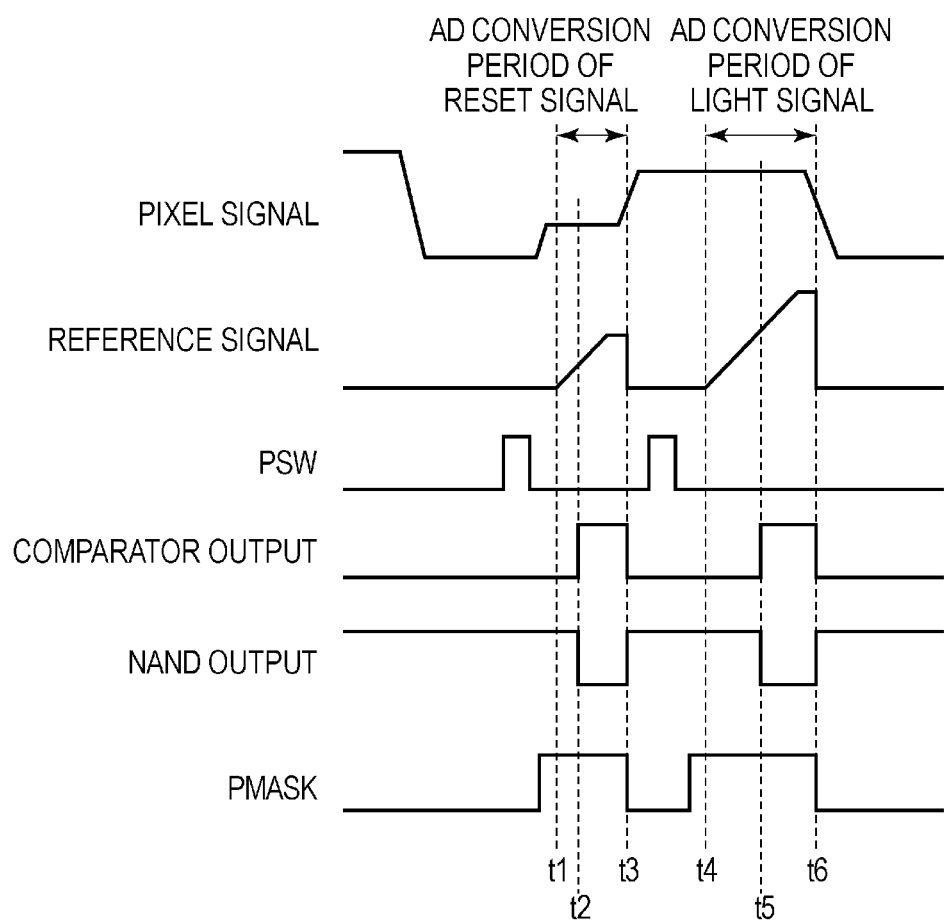
FIG. 4B is a diagram illustrating a method of driving the imaging device according to the first embodiment.
Figure 5:
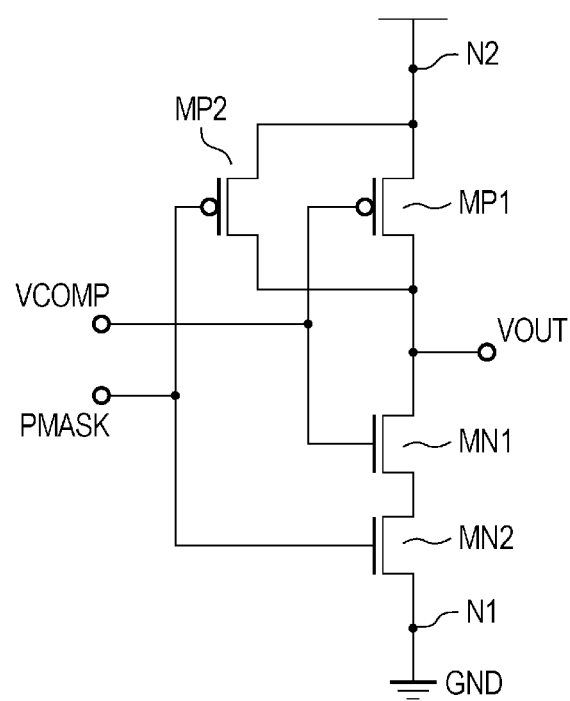
FIG. 5 is a circuit diagram illustrating an example of a NAND circuit.

An imaging device and a method of driving the same according to a first embodiment of the present invention will be described with reference to FIG. 1 to FIG. 5. FIG. 1 is a block diagram illustrating a general configuration of an imaging device according to the present embodiment. FIG. 2 is a circuit diagram illustrating a configuration example of a pixel in the imaging device according to the present embodiment. FIG. 3 is a schematic diagram illustrating a path on which a signal output from the pixel is input to a counter in the imaging device according to the present embodiment. FIG. 4A and FIG. 4B are diagrams illustrating a specific configuration example and a method of driving the imaging device according to the present embodiment. FIG. 5 is a circuit diagram illustrating an example of a NAND circuit.

As illustrated in FIG. 1, the imaging device according to the present embodiment includes a pixel array unit 10, a vertical scanning circuit 20, a readout circuit unit 30, an AD conversion circuit unit 40, a ramp signal generation circuit 50, a control circuit 60, a horizontal scanning circuit 70, and an output circuit 80.

In the pixel array unit 10, a plurality of pixels 12 arranged in a matrix over a plurality of rows and a plurality of columns are provided. While FIG. 1 depicts 12 pixels 12 arranged in three rows by four columns out of the pixels 12 of the pixel array unit 10, the number of pixels 12 of the pixel array unit 10 is not limited in particular.

On each column of the pixel array unit 10, the control line 14 is arranged extending in a first direction (the horizontal direction in FIG. 1). The control line 14 is connected to the pixels 12 aligned in the first direction, respectively, to form a signal line common to these pixels 12. In the present specification, the first direction in which the control line 14 extends may be referred to as a row direction.

Further, on each column of the pixel array unit 10, a vertical output line 16 is arranged extending in a second direction crossing the first direction (the vertical direction in FIG. 1). The vertical output line 16 is connected to the pixels 12 aligned in the second direction, respectively, to form a signal line common to these pixels 12. In the present specification, the second direction in which the vertical output line 16 extends may be referred to as a column direction.

The control line 14 on each row is connected to the vertical scanning circuit 20. The vertical scanning circuit 20 is a circuit unit that supplies, to the pixels 12 via the control line 14, control signals used for driving readout circuits within the pixels 12 when pixel signals are read out from the pixels 12. One end of the vertical output line 16 on each column is connected to the readout circuit unit 30.

The readout circuit unit 30 includes a plurality of column readout circuits 32 corresponding to respective columns of the pixel array unit 10. Pixel signals read out from the pixels 12 are input to the column readout circuits 32 on the corresponding columns via the vertical output lines 16. The column readout circuit 32 is a circuit unit that has a function as a sample-hold circuit that samples and holds a pixel signal and performs a predetermined process such as an amplification process, for example, on a pixel signal if necessary.

The AD conversion circuit unit 40 is a column-parallel AD converter and includes a plurality of comparators 42, a plurality of buffer circuits 44, and a plurality of counters 46 corresponding to respective columns of the pixel array unit 10. Out of these components of the AD conversion circuit unit 40, the comparators 42 are each formed of an analog circuit, and the buffer circuits 44 and the counters 46 are each formed of a digital circuit.

The comparator 42 includes two input terminals and one output terminal. An output signal from the column readout circuit 32 on the corresponding column and a reference signal (ramp signal) supplied from the ramp signal generation circuit 50 are input to the input terminals of the comparator 42 on each column. The ramp signal is a signal whose level gradually increases or decreases from a predetermined value with time elapsing. The output terminal of the comparator 42 on the corresponding column is connected to the input terminal of the buffer circuit 44 on each column. The counter 46 includes three input terminals and one output terminal. The output terminal of the buffer circuit 44 on the corresponding column, the control circuit 60, and the horizontal scanning circuit 70 are connected to the input terminals of the counter 46 on each column. The output terminal of the counter 46 on each column is connected to the output circuit 80 via a horizontal output line 48.

The horizontal scanning circuit 70 is a circuit unit that supplies, to the counter 46 on each column, a control signal used for outputting a pixel signal stored in the counter 46. The output circuit 80 includes a signal processing unit that performs a process such as CDS (Correlated Double Sampling) on a pixel signal or an external interface such as LVDS (Low Voltage Differential Signaling).

The control circuit 60 is a circuit unit that supplies, to the vertical scanning circuit 20, the readout circuit unit 30, the AD conversion circuit unit 40, the ramp signal generation circuit 50, the horizontal scanning circuit 70, and the output circuit 80, control signals which control the operation of the above or the timing thereof. At least some of these control signals may be supplied from the external of the imaging device 100. Further, the control circuit 60 includes a bias circuit unit that controls currents flowing in amplifiers (not illustrated) of the readout circuit unit 30 or the comparators 42 (see FIG. 3 and the like) of the AD conversion circuit unit 40.

FIG. 2 is a circuit diagram illustrating an example of the pixel 12 of the pixel array unit 10. Each of the plurality of pixels 12 includes a photoelectric converter PD, a transfer transistor M1, a reset transistor M2, an amplifier transistor M3, and a select transistor M4.

The photoelectric converter PD is a photodiode, for example. The photodiode of the photoelectric converter PD has the anode connected to the ground voltage line and the cathode connected to the source of the transfer transistor M1. The drain of the transfer transistor M1 is connected to the source of the reset transistor M2 and the gate of the amplifier transistor M3. The connection node of the drain of the transfer transistor M1, the source of the reset transistor M2, and the gate of the amplifier transistor M3 is a so-called floating diffusion (FD) portion. The FD portion includes a capacitance component (floating diffusion capacitance) and has a function as a charge holding portion. FIG. 2 illustrates this capacitance component as a capacitor (C1) whose one terminal is connected to the FD portion. In the following description, the FD portion may be denoted as the holding portion C1. The other terminal of the capacitor forming the holding portion C1 is grounded.

The drain of the reset transistor M2 and the drain of the amplifier transistor M3 are connected to a power source voltage line (Vdd). Note that the voltage supplied to the drain of the reset transistor M2 and the voltage supplied to the drain of the amplifier transistor M3 may be the same as or different from each other. The source of the amplifier transistor M3 is connected to the drain of the select transistor M4. The source of the select transistor M4 is connected to the vertical output line 16.

In the case of the pixel configuration of FIG. 2, the control line 14 on each row arranged in the pixel array unit 10 includes signal lines TX, RST, and SEL. The signal line TX is connected to the gates of the transfer transistors M1 of the pixels 12 belonging to the corresponding row, respectively, to form a signal line common to these pixels 12. The signal line RST is connected to the gates of the reset transistors M2 of the pixels 12 belonging to the corresponding row, respectively, to form a signal line common to these pixels 12. The signal line SEL is connected to the gates of the select transistors M4 of the pixels 12 belonging to the corresponding row, respectively, to form a signal line common to these pixels 12.

A control signal PTX that is a drive pulse for controlling the transfer transistor M1 is output from the vertical scanning circuit 20 to the signal line TX. A control signal PRST that is a drive pulse for controlling the reset transistor M2 is output from the vertical scanning circuit 20 to the signal line RST. A control signal PSEL that is a drive pulse for controlling the select transistor M4 is output from the vertical scanning circuit 20 to the signal line SEL. When each transistor is formed of an n-channel transistor, in response to a high-level control signal being supplied from the vertical scanning circuit 20, the corresponding transistor is turned on. Further, in response to a low-level control signal being supplied from the vertical scanning circuit 20, the corresponding transistor is turned off.

The vertical output line 16 arranged on each column of the pixel array unit 10 is connected to the sources of the select transistors M4 of pixels 12 aligned in the column direction, respectively, to form a signal line common to these pixels 12. Note that the select transistor M4 of the pixel 12 may be omitted. In this case, the vertical output line 16 is connected to the source of the amplifier transistor M3. The vertical output line 16 is connected to a current source 18. The current source 18 is controlled by a bias circuit unit (not illustrated).

The photoelectric converter PD converts (photoelectrically converts) an incident light to an amount of charges (electrons in this example) in accordance with the light amount of the incident light and accumulates generated charges. The transfer transistor M1 is a transfer unit that transfers charges held by the photoelectric converter PD to the holding portion C1. The holding portion C1 holds charges transferred from the photoelectric converter PD and sets the voltage of the FD portion, which is also an input node of an amplifier unit (the gate of the amplifier transistor M3), to a voltage in accordance with the capacitance value of the holding portion C1 and the amount of the transferred charges. The reset transistor M2 is a reset unit that resets the FD portion to a predetermined voltage in accordance with the voltage of the power source voltage line Vdd. The select transistor M4 selects the pixel 12 which outputs a signal to the vertical the vertical output line 16. The amplifier transistor M3 is configured such that the power source voltage is supplied to the drain and the bias current is supplied to the source from the current source 18 via the select transistor M4 and forms an amplifier unit in which the gate is the input node (source follower circuit). Thereby, the amplifier transistor M3 outputs an amplified signal based on the voltage of the FD portion to the vertical output line 16 via the select transistor M4.

The transfer transistor M1, the reset transistor M2, and the select transistor M4 of the pixel 12 are controlled on a row basis by the control signals PTX, PRST, and PSEL supplied from the vertical scanning circuit 20 via the control signal lines TX, RST, and SEL as described above. The pixel signals of the pixels 12 belonging to the row to be selected by the control signal PSEL are simultaneously output to the corresponding vertical output lines 16 of respective pixels 12.

The pixel signals output to the vertical output lines 16 are input to the readout circuit unit 30, subjected to a predetermined process, for example, an amplification process or the like in the readout circuits 32 on respective columns, and then output to the AD conversion circuit unit 40.

The pixel signals input to the AD conversion circuit unit 40 and a reference signal (ramp signal) output from the ramp signal generation circuit 50 are input to the comparators 42. Each of the comparators 42 performs comparison operation for comparing the signal level of a pixel signal with the signal level of the reference signal. The comparator 42 outputs, to the counter 46 via the buffer circuit 44, a signal obtained in accordance with the comparison result of the signal level of a pixel signal and the signal level of the ramp signal. The counter 46 counts the number of clocks of a clock signal generated by the control circuit 60 and stores, as a digital value of the pixel signal, the count value at the timing when the magnitude relationship of the signal level of the pixel signal and the signal level of the ramp signal is inverted.

The horizontal scanning circuit 70 outputs control signals sequentially on a column basis to the counters 46 of the AD conversion circuit unit 40. The counter 46 which has received a control signal from the horizontal scanning circuit 70 outputs an analog-to-digital-converted pixel signal to the output circuit 80 via the horizontal output line 48.

The output circuit 80 performs predetermined signal processing such as digital CDS on the pixel signal input from the AD conversion circuit unit 40 and then externally outputs a pixel signal resulted after the signal processing via an external interface.

FIG. 3 is a schematic diagram of a path on which a pixel signal output from the pixel 12 is input to the counter 46. For simplified illustration, FIG. 3 illustrates only the pixel 12, the ramp signal generation circuit 50, the comparator 42, the buffer circuit 44, and the counter 46 out of the components of the imaging device described above. Out of the components illustrated in FIG. 3, the pixel 12, the comparator 42, and the ramp signal generation circuit 50 are formed of analog circuits, and the buffer circuit 44 and the counter 46 are formed of digital circuits.

The pixel 12 supplies an analog pixel signal in accordance with the amount of a received light to the comparator 42. Further, a ramp waveform signal (ramp signal) whose signal level changes with inclination with time is supplied from the ramp signal generation circuit 50 as a reference signal supply circuit to the comparator 42. The comparator 42 outputs, to the buffer circuit 44, a signal obtained by comparison of a pixel signal from the pixels 12 with a signal from the ramp signal generation circuit 50. The buffer circuit 44 converts an analog signal having a slow slew rate output from the comparator 42 to a logic signal having a fast slew rate and outputs the logic signal to the counter 46. For example, a high (Hi) level signal is supplied to the counter 46 if the reference signal is larger than the pixel signal, and a low (Lo) level differential signal is supplied to the counter 46 if the reference signal is smaller than the pixel signal. Here, a circuit that processes a signal having an analog-like intermediate value or a signal having a slow slew rate is defined as an analog circuit, and a circuit that handles only Hi/Lo binary signals is defined as a digital circuit.

FIG. 4A illustrates a more specific configuration example of the comparator 42 and the buffer circuit 44. The comparator 42 comprises a differential amplifier circuit, for example, in which a pixel signal is input to the inverting input terminal and the reference signal that is a ramp signal is input to the non-inverting input terminal. The reference signal is a ramp signal whose signal level gradually increases with time elapsing. The buffer circuit 44 includes a NAND circuit 52 and a switch SW.

The NAND circuit 52 is a two-input NAND circuit in which the output signal of the comparator 42 is input to one input terminal and a control signal PMASK is input to the other input terminal. The switch SW is connected between a power source node, which is a first node supplied with the first power source voltage (Vdd), and the NAND circuit 52. The output terminal of the NAND circuit 52 that is the output terminal of the buffer circuit 44 includes a capacitance component. In FIG. 4A, this capacitance component is illustrated as a capacitor C connected to the output terminal of the NAND circuit 52. The capacitor C may be a parasitic capacitor of the output terminal of the NAND circuit 52, or may be a capacitor intentionally connected to the output terminal of the NAND circuit 52.

While not limited in particular, the two-input NAND circuit forming the NAND circuit 52 may be formed of a circuit illustrated in FIG. 5, for example. The NAND circuit illustrated in FIG. 5 includes two n-channel MOS transistors MN1 and MN2 connected in series and two p-channel MOS transistors MP1 and MP2 connected in parallel. The source of the p-channel MOS transistor MP1 and the source of the p-channel MOS transistor MP2 are connected to the power source node. The drain of the p-channel MOS transistor MP1 and the drain of the p-channel MOS transistor MP2 are connected to the drain of the n-channel MOS transistor MN1. The source of the n-channel MOS transistor MN1 is connected to the drain of the n-channel MOS transistor MN2. The source of the n-channel MOS transistor MN2 is connected to the ground (GND) node, which is a second node supplied with the second power source voltage (ground voltage).

The gate of the p-channel MOS transistor MP1 and the gate of the n-channel MOS transistor MN1 are connected to each other, and this connection node is one input terminal (VCOMP) of the two-input NAND circuit. Further, the gate of the p-channel MOS transistor MP2 and the gate of the n-channel MOS transistor MN2 are connected to each other, and this connection node is the other input terminal (PMASK) of the two-input NAND circuit. Further, the connection node of the drain of the p-channel MOS transistor MP1, the drain of the p-channel MOS transistor MP2, and the drain of the n-channel MOS transistor MN1 is the output terminal (VOUT) of the NAND circuit.

The switch SW is a switch in which the connection state is controlled by a control signal PSW supplied from the control circuit 60. For example, the switch SW is in an on-state (conductive state) when the control signal PSW is at a high level and is in an off-state (non-conductive state) when the control signal PSW is at a low level. When the two-input NAND circuit illustrated in FIG. 5 is applied to the NAND circuit 52 of the buffer circuit 44, the switch SW is arranged at a node N2 that is a connection portion of the power source node, the source of the p-channel MOS transistor MP1, and the source of the p-channel MOS transistor MP2.

FIG. 4B is a timing chart illustrating the operation of the buffer circuit 44. In FIG. 4B, a period from the time t1 to the time t3 is an AD conversion period of a reset signal, and a period from the time t4 to the time t6 is an AD conversion period of a light signal. The time t2 is a timing when the output signal of the comparator 42 transitions from a low level to a high level in the AD conversion period of the reset signal. The time t5 is a timing when the output signal of the comparator 42 transitions from a low level to a high level in the AD conversion period of the light signal.

In the imaging device according to the present embodiment, prior to these AD conversion periods, a low level control signal PMASK is supplied to the buffer circuit 44, and a high level control signal PSW is supplied to turn on the switch SW. At this time, the output signal (VCOMP) of the comparator 42 is at a low level, for example. In response to the low level input signal (PMASK), the NAND circuit 52 outputs a high level signal. Thereby, charges are charged in the capacitor C, and the output of the NAND circuit 52 is held in the high level state.

During the AD conversion period, the control signal PMASK is held at the high level, and the control signal PSW is held at the low level. That is, during the AD conversion period, the switch SW is controlled to an off-state. Once the output signal of the comparator 42 transitions from the low level to the high level at the time t2 or the time t5, in response to the high level input signal (VCOMP) and the high level input signal (PMASK), the NAND circuit 52 outputs a low level signal.

With reference to the NAND circuit of FIG. 5, both the signal VCOMP and the control signal PMASK become the high level, and both the n-channel MOS transistors MN1 and MN2 are turned on. Thereby, the output terminal (VOUT) of the NAND circuit is connected to the GND node via the n-channel MOS transistors MN1 and MN2, and charges that have been charged in the capacitor C are extracted. This causes the output signal of the NAND circuit to transition to a low level. Thereby, a determination pulse in accordance with an output change of the comparator 42 can be output to the counter 46.

At transition of the output signal of the comparator 42 from the low level to the high level, when the output slew rate of the comparator 42 is slow, this may cause a period during which both the p-channel MOS transistor MP1 and the n-channel MOS transistor MN1 are in the on-state at the same time. In the buffer circuit 44 of the imaging device according to the present embodiment, however, since the switch SW is provided between the power source node and the NAND circuit 52 and the switch SW is in the off-state during the AD conversion period, no through-current flows between the power source node and the GND node.

The voltage of the output terminal of the NAND circuit 52 held by the capacitor C may be of the opposite polarity to the output of the buffer circuit 44 (the NAND circuit 52) expected before the inversion of the output signal of the comparator 42 at AD conversion. In the present embodiment, since the output of the buffer circuit 44 (the NAND circuit 52) expected before the inversion of the output signal of the comparator 42 is at the low level at AD conversion, the capacitor C holds the voltage corresponding to the high level. A case where the output of the buffer circuit 44 expected before the inversion of the output signal of the comparator 42 is at the high level at AD conversion will be described in a second embodiment.

In the present embodiment, since the buffer circuit 44 is formed of the NAND circuit 52, there is an advantage that the level of the capacitor C can be set by only the polarity of the control signal PMASK even with an indefinite output of the comparator 42 in a period in which the control signal PSW is at a high level before the inversion operation. When the polarity of the output of the comparator 42 in a period in which the control signal PSW is at the high level is controllable, however, the buffer circuit 44 may be formed of a different circuit such as a NOR circuit.

As described above, according to the present embodiment, a through-current flowing between the power source node and the ground node of the AD conversion circuit can be suppressed, and an increase in the power consumption or deterioration of image quality due to the operation of the AD conversion circuit can be suppressed.

Second Embodiment

Figure 6A:
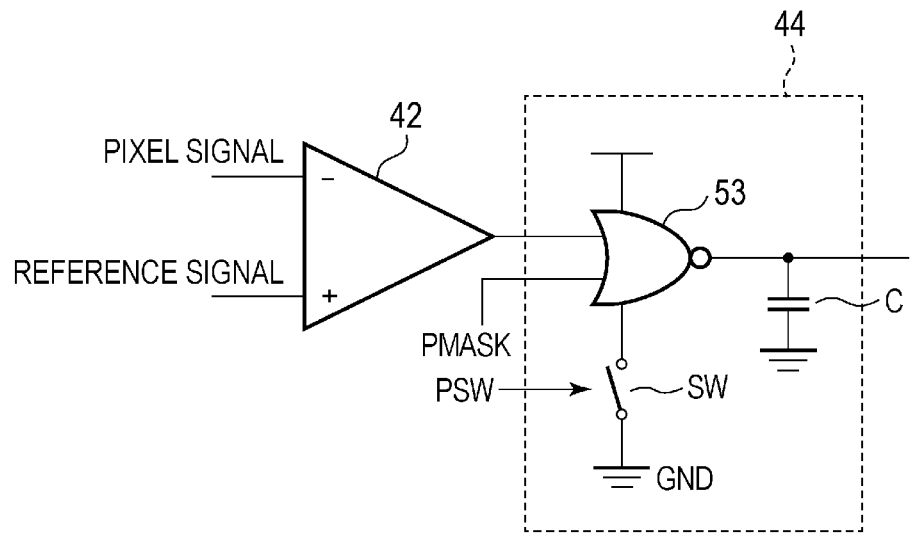
FIG. 6A is a diagram illustrating a specific configuration example of an imaging device according to a second embodiment.
Figure 6B:
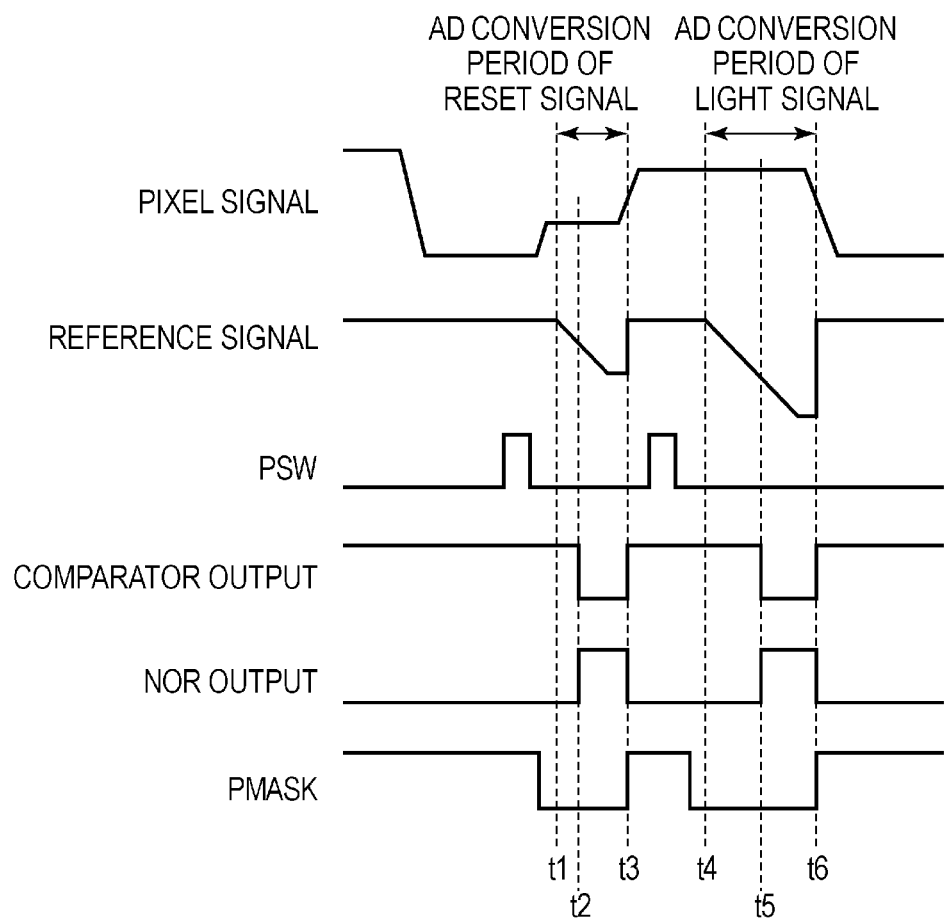
FIG. 6B is a diagram illustrating a method of driving the imaging device according to the second embodiment.
Figure 7:
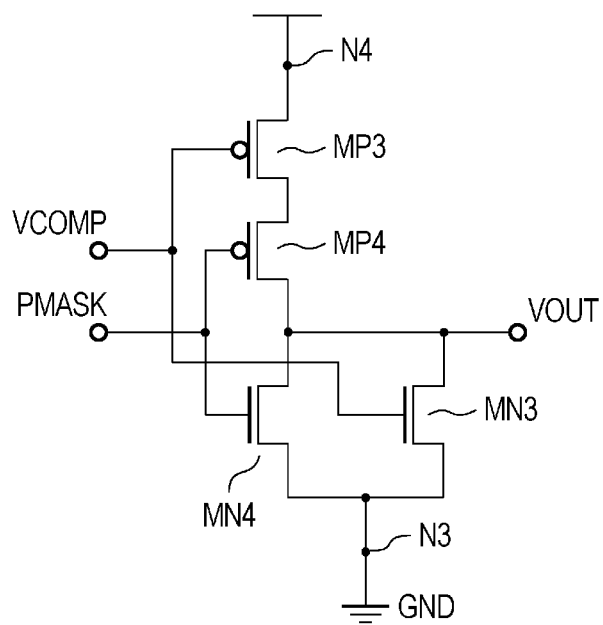
FIG. 7 is a circuit diagram illustrating an example of a NOR circuit.

An imaging device and a method of driving the same according to a second embodiment of the present invention will be described with reference to FIG. 6A to FIG. 7. The same components as those in the imaging device according to the first embodiment are labeled with the same reference symbols, and the description thereof will be omitted or simplified. FIG. 6A and FIG. 6B are diagrams illustrating a specific configuration example and a method of driving the imaging device according to the present embodiment. FIG. 7 is a circuit diagram illustrating an example of a NOR circuit.

The imaging device according to the present embodiment is the same as the imaging device according to the first embodiment except for the difference in the configuration of the buffer circuit 44 of the AD conversion circuit unit 40.

FIG. 6A illustrates a more specific configuration example of the comparator 42 and the buffer circuit 44 of the imaging device according to the present embodiment. The comparator 42 comprises a differential amplifier circuit, for example, in which a pixel signal is input to the inverting input terminal and a reference signal that is a ramp signal is input to the non-inverting input terminal. The reference signal is a ramp signal whose signal level gradually decreases with time elapsing. The buffer circuit 44 includes a NOR circuit 53 and the switch SW.

The NOR circuit 53 is a two-input NOR circuit in which the output signal of the comparator 42 is input to one input terminal and a control signal PMASK is input to the other input terminal. The switch SW is connected between the NOR circuit 53 and the GND node. The output terminal of the NOR circuit 53 that is also the output terminal of the buffer circuit 44 includes a capacitance component. In FIG. 6A, this capacitance component is illustrated as a capacitor C connected to the output terminal of the NOR circuit 53. The capacitor C may be a parasitic capacitor of the output terminal of the NOR circuit 53, or may be a capacitor intentionally connected to the output terminal of the NOR circuit 53.

While not limited in particular, the two-input NOR circuit forming the NOR circuit 53 may be formed of a circuit illustrated in FIG. 7, for example. The NOR circuit illustrated in FIG. 7 includes two p-channel MOS transistors MP3 and MP4 connected in series and two n-channel MOS transistors MN3 and MN4 connected in parallel. The source of the n-channel MOS transistor MN3 and the source of the n-channel MOS transistor MN4 are connected to the ground (GND) node. The drain of the n-channel MOS transistor MN3 and the drain of the n-channel MOS transistor MN4 are connected to the drain of the p-channel MOS transistor MP4. The source of the p-channel MOS transistor MP4 is connected to the drain of the p-channel MOS transistor MP3. The source of the p-channel MOS transistor MP3 is connected to the power source node.

The gate of the p-channel MOS transistor MP3 and the gate of the n-channel MOS transistor MN3 are connected to each other, and this connection node is one input terminal (VCOMP) of the two-input NOR circuit. Further, the gate of the p-channel MOS transistor MP4 and the gate of the n-channel MOS transistor MN4 are connected to each other, and this connection node is the other input terminal (PMASK) of the two-input NOR circuit. Further, the connection node of the drain of the n-channel MOS transistor MN3, the drain of the n-channel MOS transistor MN4, and the drain of the p-channel MOS transistor MP4 is the output terminal (VOUT) of the NOR circuit.

The switch SW is a switch in which the connection state is controlled by a control signal PSW supplied from the control circuit 60. For example, the switch SW is in an on-state (conductive state) when the control signal PSW is at a high level and is in an off-state (non-conductive state) when the control signal PSW is at a low level. When the two-input NOR circuit illustrated in FIG. 7 is applied to the NOR circuit 53 of the buffer circuit 44, the switch SW is arranged at a node N3 that is a connection portion of the GND node and the source of the n-channel MOS transistor MN3.

FIG. 6B is a timing chart illustrating the operation of the buffer circuit 44. In FIG. 6B, a period from the time t1 to the time t3 is an AD conversion period of a reset signal, and a period from the time t4 to the time t6 is an AD conversion period of a light signal. The time t2 is a timing when the output signal of the comparator 42 transitions from a high level to a low level in the AD conversion period of the reset signal. The time t5 is a timing when the output signal of the comparator 42 transitions from a high level to a low level in the AD conversion period of the light signal.

In the imaging device according to the present embodiment, prior to these AD conversion periods, a high level control signal PMASK is supplied to the buffer circuit 44, and a high level control signal PSW is supplied to turn on the switch SW. At this time, the output signal (VCOMP) of the comparator 42 is at a high level, for example. In response to the high level input signal (PMASK), the NOR circuit 53 outputs a low level signal. Thereby, charges in the capacitor C are extracted to the GND node, and the output of the NOR circuit 53 is held in the low level state.

During the AD conversion period, the control signal PMASK is held at the low level, and the control signal PSW is held at the low level. That is, during the AD conversion period, the switch SW is controlled to an off-state. Once the output signal of the comparator 42 transitions from the high level to the low level at the time t2 or the time t5, in response to the low level input signal (VCOMP) and the low level input signal (PMASK), the NOR circuit 53 outputs a high level signal.

With reference to the NOR circuit of FIG. 7, both the signal VCOMP and the control signal PMASK become the low level, and both the p-channel MOS transistors MP3 and MP4 are turned on. Thereby, the output terminal (VOUT) of the NOR circuit 53 is connected to the power source node via the p-channel MOS transistors MP3 and MP4, and charges are charged in the capacitor C. This causes the output signal of the NOR circuit 53 to transition to a high level. Thereby, a determination pulse in accordance with an output change of the comparator 42 can be output to the counter 46.

At transition of the output signal of the comparator 42 from the high level to the low level, when the output slew rate of the comparator 42 is slow, this may cause a period during which both the p-channel MOS transistor MP3 and the n-channel MOS transistor MN3 are in the on-state at the same time. In the buffer circuit 44 of the imaging device according to the present embodiment, however, since the switch SW is provided between the GND node and the NOR circuit 53 and the switch SW is in the off-state during the AD conversion period, no through-current flows between the power source node and the GND node.

The voltage of the output terminal of the NOR circuit 53 held by the capacitor C may be of the opposite polarity to the output of the NOR circuit 53 expected before the inversion of the output signal of the comparator 42 at AD conversion. In the present embodiment, since the inclination of the reference signal is opposite to that in the first embodiment and the output of the NOR circuit 53 expected before the inversion of the output signal of the comparator 42 is at the high level at AD conversion, the capacitor C holds the voltage corresponding to the low level.

In the present embodiment, since the buffer circuit 44 is formed of the NOR circuit 53, there is an advantage that the level of the capacitor C can be set by only the polarity of the control signal PMASK even with an indefinite output of the comparator 42 in a period in which the control signal PSW is at a high level before the inversion operation. When the polarity of the output of the comparator 42 in a period in which the control signal PSW is at the high level is controllable, however, the buffer circuit 44 may be formed of a different circuit such as the NAND circuit used in the first embodiment.

As described above, according to the present embodiment, a through-current flowing between the power source node and the ground node of the AD conversion circuit can be suppressed, and an increase in the power consumption or deterioration of image quality due to the operation of the AD conversion circuit can be suppressed.

Third Embodiment

Figure 8A:
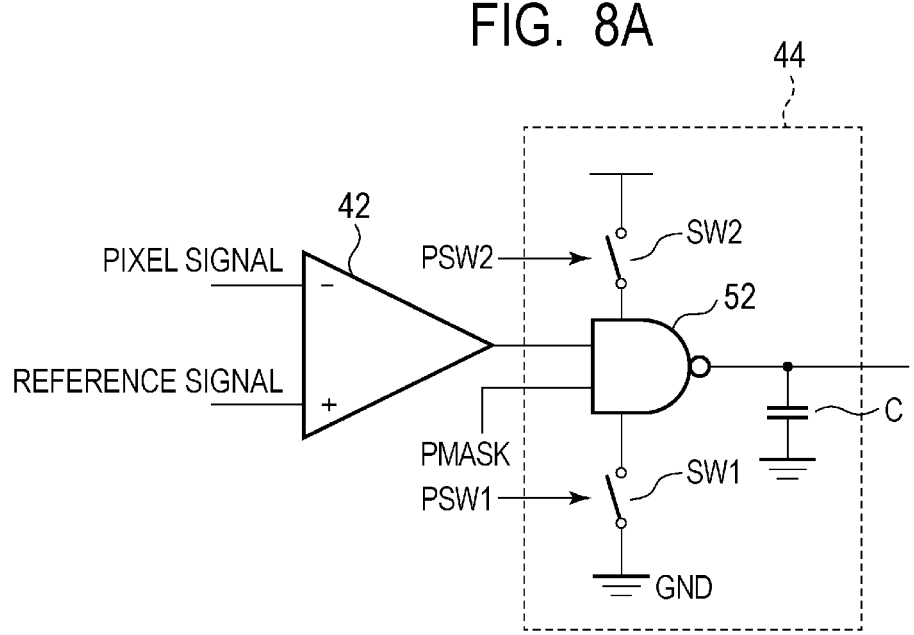
FIG. 8A is a diagram illustrating a specific configuration example of an imaging device according to a third embodiment.
Figure 8B:
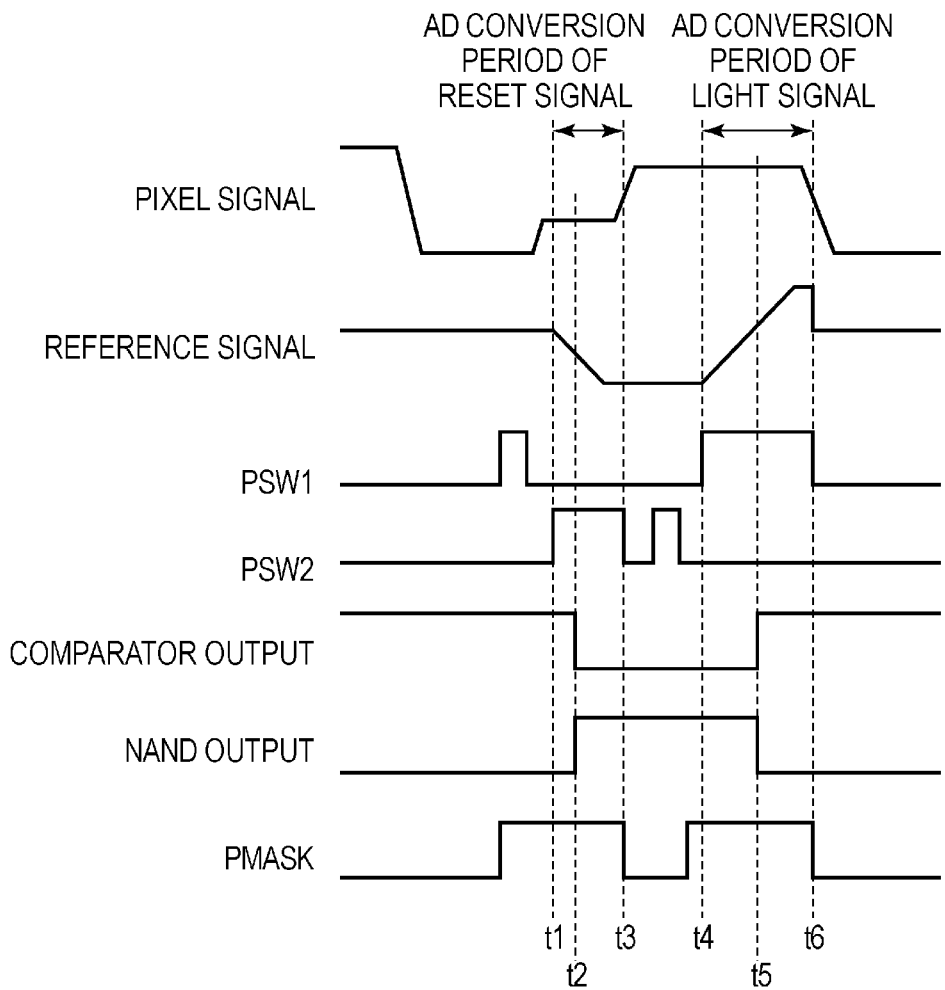
FIG. 8B is a diagram illustrating a method of driving the imaging device according to the third embodiment.

An imaging device and a method of driving the same according to a third embodiment of the present invention will be described with reference to FIG. 8A and FIG. 8B. The same components as those in the imaging device according to the first embodiment are labeled with the same reference symbols, and the description thereof will be omitted or simplified. FIG. 8A and FIG. 8B are diagrams illustrating a specific configuration example and a method of driving the imaging device according to the present embodiment.

The imaging device according to the present embodiment is the same as the imaging device according to the first embodiment except for the difference in the configuration of the buffer circuit 44 of the AD conversion circuit unit 40.

FIG. 8A illustrates a more specific configuration example of the comparator 42 and the buffer circuit 44 of the imaging device of the present embodiment. The comparator 42 comprises a differential amplifier circuit, for example, in which a pixel signal is input to the inverting input terminal and the reference signal that is a ramp signal is input to the non-inverting input terminal. The reference signal is a ramp signal whose signal level gradually decreases with time elapsing during the AD conversion period of a reset signal and is a ramp signal whose signal level gradually increases with time elapsing during the AD conversion period of a light signal. The buffer circuit 44 includes a NAND circuit 52, a switch SW1, and a switch SW2.

The NAND circuit 52 is a two-input NAND circuit in which the output signal of the comparator 42 is input to one input terminal and a control signal PMASK is input to the other input terminal. The switch SW1 is connected between the NAND circuit 52 and the GND node. The switch SW2 is connected between the power source node and the NAND circuit 52. The output terminal of the NAND circuit 52 that is also the output terminal of the buffer circuit 44 includes a capacitance component. In FIG. 8A, this capacitance component is illustrated as a capacitor C connected to the output terminal of the NAND circuit 52. The capacitor C may be a parasitic capacitor of the output terminal of the NAND circuit 52, or may be a capacitor intentionally connected to the output terminal of the NAND circuit 52.

The switch SW1 is a switch in which the connection state is controlled by a control signal PSW1 supplied from the control circuit 60. For example, the switch SW1 is in an on-state (conductive state) when the control signal PSW1 is at a high level and is in an off-state (non-conductive state) when the control signal PSW1 is at a low level. Further, the switch SW2 is a switch in which the connection state is controlled by a control signal PSW2 supplied from the control circuit 60. For example, the switch SW2 is in an on-state (conductive state) when the control signal PSW2 is at a high level and is in an off-state (non-conductive state) when the control signal PSW2 is at a low level. When the two-input NAND circuit illustrated in FIG. 5 is applied to the NAND circuit 52 of the buffer circuit 44, the switch SW1 is arranged at the node N1, and the switch SW2 is arranged at the node N2.

An example of a case to which the buffer circuit 44 of the configuration illustrated in FIG. 8A is applied is a case where both of an up-signal whose signal level gradually increases and a down-signal whose signal level gradually decreases are used as the reference signal to be input to the comparator 42. For example, the down-signal can be used for AD conversion of a reset signal, and the up-signal can be used in AD conversion of a light signal.

FIG. 8B is a timing chart illustrating the operation of the buffer circuit 44. In FIG. 8B, a period from the time t1 to the time t3 is an AD conversion period of a reset signal, and a period from the time t4 to the time t6 is an AD conversion period of a light signal. The time t2 is a timing when the output signal of the comparator 42 transitions from a high level to a low level in the AD conversion period of the reset signal. The time t5 is a timing when the output signal of the comparator 42 transitions from a low level to a high level in the AD conversion period of the light signal.

In the imaging device according to the present embodiment, prior to the AD conversion period of the reset signal, a high level control signal PMASK is supplied to the buffer circuit 44, and a high level control signal PSW1 is supplied to turn on the switch SW1. At this time, the output signal (VCOMP) of the comparator 42 is at a high level. In response to the high level input signal (VCOMP) and the high level input signal (PMASK), the NAND circuit 52 outputs a low level signal. Thereby, charges in the capacitor C are extracted to the GND node via the switch SW1, and the output of the NAND circuit 52 is held in the low level state.

During the AD conversion period of the reset signal, the control signals PMASK and PSW2 are held at the high level, and the control signal PSW1 is held at the low level. That is, during the AD conversion period, the switch SW1 is controlled to an off-state, and the switch SW2 is controlled to an on-state. Once the output signal of the comparator 42 transitions from the high level to the low level at the time t2, in response to the low level input signal (VCOMP) and the high level input signal (PMASK), the NAND circuit 52 outputs a high level signal.

With reference to the NAND circuit of FIG. 5, the signal VCOMP becomes the low level, and the p-channel MOS transistor MP1 is turned on. Thereby, the output terminal of the NAND circuit is connected to the power source node via the p-channel MOS transistor MP1 and the switch SW2, and charges are charged in the capacitor C. This causes the output signal of the NAND circuit 52 to transition to a high level. Thereby, a determination pulse in accordance with an output change of the comparator 42 can be output to the counter 46.

At transition of the output signal of the comparator 42 from the high level to the low level, when the output slew rate of the comparator 42 is slow, this may cause a period during which both the p-channel MOS transistor MP1 and the n-channel MOS transistor MN1 are in the on-state at the same time. In the buffer circuit 44 of the imaging device according to the present embodiment, however, since the switch SW1 is provided between the GND node and the NAND circuit 52 and the switch SW1 is in the off-state during the AD conversion period, no through-current flows between the power source node and the GND node.

On the other hand, in the AD conversion of the light signal, prior to the AD conversion period of the light signal, a low level control signal PMASK is supplied to the buffer circuit 44 and a high level control signal PSW2 is supplied to turn on the switch SW2. At this time, the output signal (VCOMP) of the comparator 42 is at a low level. In response to the low level input signal (PMASK), the NAND circuit 52 outputs a high level signal. Thereby, charges are charged in the capacitor C via the switch SW2, and the output of the NAND circuit 52 is held in the high level state.

Note that, since the output terminal of the NAND circuit 52 is already in a high level state after the AD conversion period of the reset signal, charging of charges into the capacitor C in the period between the AD conversion period of the reset signal and the AD conversion period of the light signal can be omitted.

During the AD conversion period of the light signal, the control signals PMASK and PSW1 are held at the high level, and the control signal PSW2 is held at the low level. That is, during the AD conversion period, the switch SW2 is controlled to an off-state, and the switch SW1 is controlled to an on-state. Once the output signal of the comparator 42 transitions from the low level to the high level at the time t5, in response to the high level input signal (VCOMP) and the high level input signal (PMASK), the NAND circuit 52 outputs a low level signal.

With reference to the NAND circuit of FIG. 5, both the signal VCOMP and the control signal PMASK become the high level, and both the n-channel MOS transistor MN1 and MN2 are turned on. Thereby, the output terminal (VOUT) of the NAND circuit is connected to the GND node via the n-channel MOS transistors MN1 and MN2 and the switch SW1, and charges that have been charged in the capacitor C are extracted. This causes the output signal of the NAND circuit 52 to transition to a low level. Thereby, a determination pulse in accordance with an output change of the comparator 42 can be output to the counter 46.

At transition of the output signal of the comparator 42 from the low level to the high level, when the output slew rate of the comparator 42 is slow, this may cause a period during which both the p-channel MOS transistor MP1 and the n-channel MOS transistor MN1 are in the on-state at the same time. In the buffer circuit 44 of the imaging device according to the present embodiment, however, since the switch SW2 is provided between the power source node and the NAND circuit 52 and the switch SW2 is in the off-state during the AD conversion period, no through-current flows between the power source node and the GND node.

As described above, according to the present embodiment, a through-current flowing between the power source node and the ground node of the AD conversion circuit can be suppressed, and an increase in the power consumption or deterioration of image quality due to the operation of the AD conversion circuit can be suppressed.

Fourth Embodiment

Figure 9A:
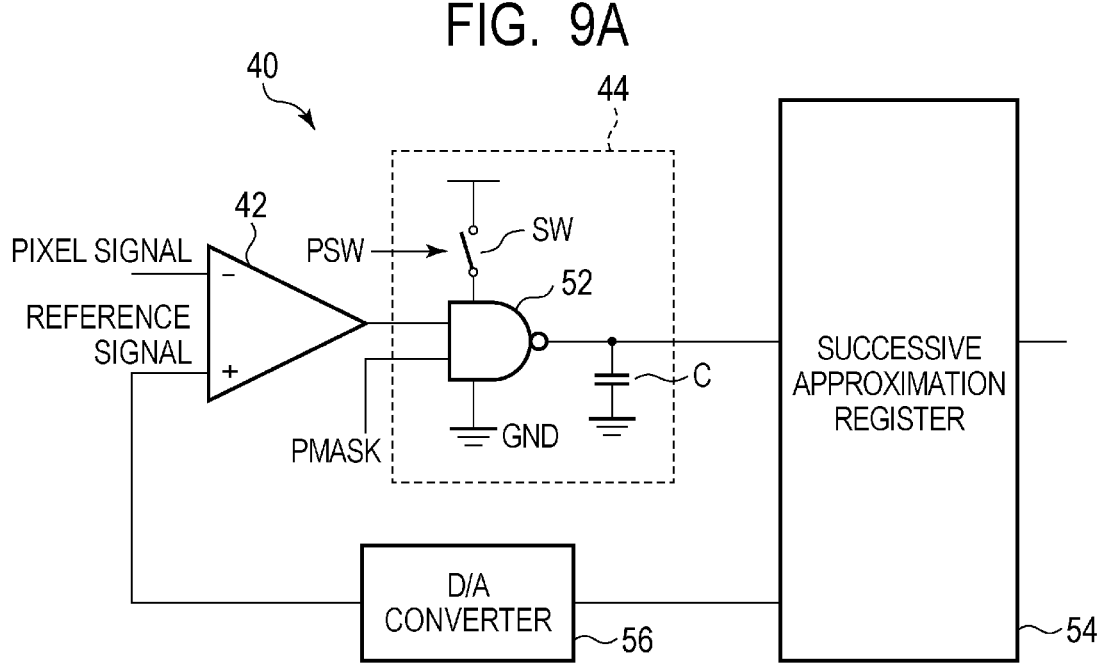
FIG. 9A is a diagram illustrating a specific configuration example of an imaging device according to a fourth embodiment.
Figure 9B:
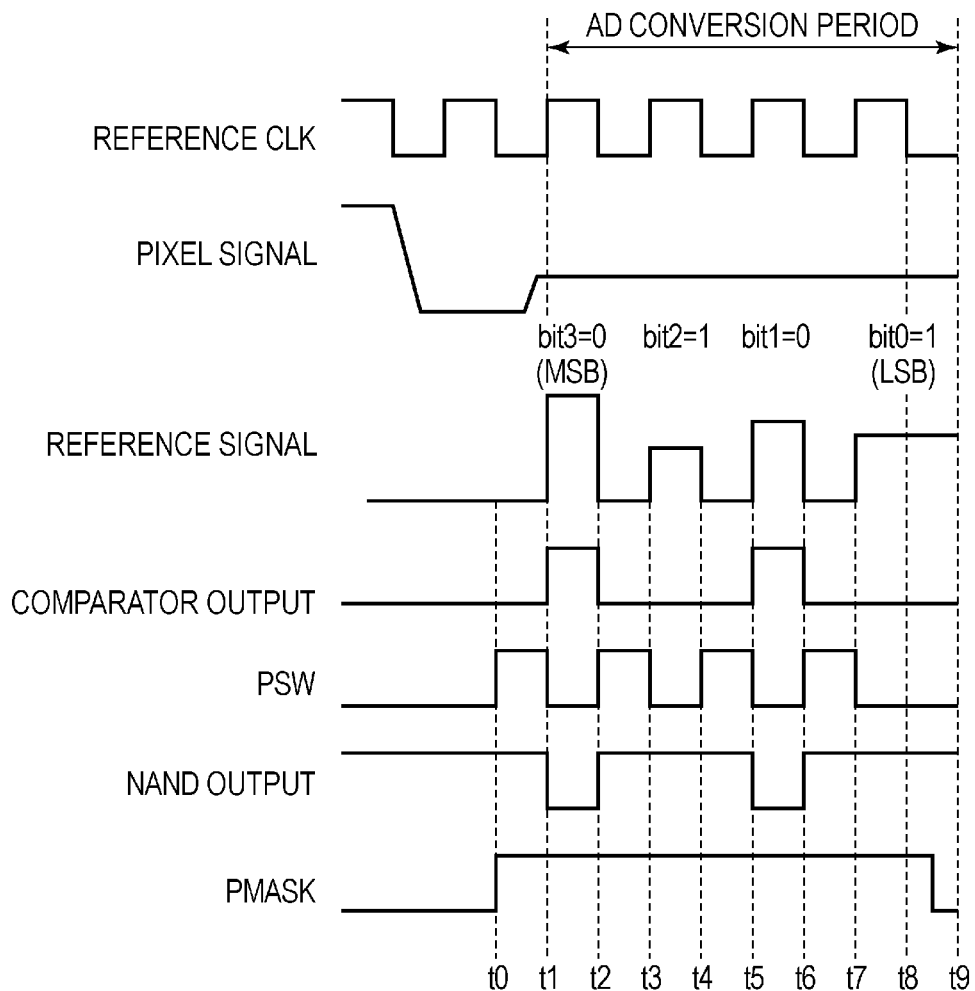
FIG. 9B is a diagram illustrating a method of driving the imaging device according to the fourth embodiment.

An imaging device and a method of driving the same according to a fourth embodiment of the present invention will be described with reference to FIG. 9A and FIG. 9B. The same components as those in the imaging device according to the first embodiment are labeled with the same reference symbols, and the description thereof will be omitted or simplified. FIG. 9A and FIG. 9B are diagrams illustrating a specific configuration example and a method of driving the imaging device according to the present embodiment.

While application examples to the ramp-type AD converter that compares a pixel signal and a ramp signal have been described in the first to third embodiments, the phenomenon in which a through-current flows between the power source node and the GND node during an AD conversion period may similarly occur when a successive approximation-type AD converter is used. In the present embodiment, an application example when the AD conversion circuit unit 40 is formed of a successive approximation-type AD converter will be described.

The imaging device according to the present embodiment is the same as the imaging device according to the first embodiment except for a difference in the configuration of the AD conversion circuit unit 40.

As illustrated in FIG. 9A, the AD conversion circuit unit 40 of the imaging device according to the present embodiment includes the comparator 42, the buffer circuit 44, a successive approximation register 54, and a digital-to-analog (D/A) converter 56. The buffer circuit 44 has the same configuration as that of the first embodiment and, between the power source node and the NAND circuit 52, has the switch SW that is controlled by the control signal PSW.

In the successive approximation AD conversion, a reference value of a predetermined number of bits generated by the successive approximation register 54 is converted to an analog signal by the D/A converter 56 and input to the comparator 42. The comparator 42 compares a pixel signal with a reference signal and supplies an output signal that is a comparison result to the successive approximation register 54 via the buffer circuit 44. In the successive approximation register 54, a reference value to be output to the comparator 42 in the next cycle is generated in accordance with the value of the output signal of the comparator 42. Each bit is determined from the most significant bit to the least significant bit by this comparison process, and the pixel signal is converted to a digital signal. The comparison process of each bit is performed for every clock (CLK) cycle that is a reference.

As an example, a case where a pixel signal is converted to a digital signal of four bits from bit 0 to bit 3 will be described using FIG. 9B. The bit 0 is the least significant bit (LSB), and the bit 3 is the most significant bit (MSB).

In the first CLK cycle (the time t1 to the time t2) of an AD conversion period, a comparison process of a pixel signal with the bit 3 is performed. The successive approximation register 54 generates a reference value whose target bit (bit 3) is 1 and other bits are 0, that is, 1000. The D/A converter 56 performs DA conversion on this reference signal and supplies the converted reference signal to the comparator 42. The comparator 42 compares a pixel signal with the reference signal and outputs a signal in accordance with the magnitude relationship thereof. For example, when the level of the reference signal is larger than the level of a pixel signal, the comparator 42 outputs a high level signal. In this case, the bit 3 is determined as 0 and stored in the successive approximation register 54.

In the next CLK cycle (the time t3 to the time t4), a comparison process of the pixel signal with the bit 2 is performed. The successive approximation register 54 generates a reference value whose target bit (bit 2) is 1 and other bits whose values have not yet been determined are 0, that is, 0100. The D/A converter 56 performs DA conversion on this reference signal and supplies the converted reference signal to the comparator 42. The comparator 42 compares a pixel signal with the reference signal and outputs a signal in accordance with the magnitude relationship thereof. For example, when the level of the reference signal is smaller than the level of a pixel signal, the comparator 42 outputs a low level signal. In this case, the bit 2 is determined as 1 and stored in the successive approximation register 54.

In the next CLK cycle (the time t5 to the time t6), a comparison process of the pixel signal with the bit 1 is performed. The successive approximation register 54 generates a reference value whose target bit (bit 1) is 1 and other bit whose value has not yet been determined are 0, that is, 0110. The D/A converter 56 performs DA conversion on this reference signal and supplies the converted reference signal to the comparator 42. The comparator 42 compares a pixel signal with the reference signal and outputs a signal in accordance with the magnitude relationship thereof. For example, when the level of the reference signal is larger than the level of a pixel signal, the comparator 42 outputs a high level signal. In this case, the bit 1 is determined as 0 and stored in the successive approximation register 54.

In the next CLK cycle (the time t7 to the time t8), a comparison process of the pixel signal with the bit 0 is performed. The successive approximation register 54 generates a reference value whose target bit (bit 0) is 1, that is, 0101. The D/A converter 56 performs DA conversion on this reference signal and supplies the converted reference signal to the comparator 42. The comparator 42 compares a pixel signal with the reference signal and outputs a signal in accordance with the magnitude relationship thereof. For example, when the level of the reference signal is smaller than the level of a pixel signal, the comparator 42 outputs a low level signal. In this case, the bit 0 is determined as 1 and stored in the successive approximation register 54. In such a way, the value of the digital signal analog-to-digital-converted from the pixel signal is determined as 0101.

Also in successive approximation AD conversion, at a transition of the output signal of the comparator 42 from a low level to a high level, when the output slew rate of the comparator 42 is slow, this may cause a period during which both the p-channel MOS transistor MP1 and the n-channel MOS transistor MN1 of FIG. 5 are in the on-state at the same time.

Thus, also in the present embodiment, the switch SW is provided between the power source node and the NAND circuit 52 of the buffer circuit 44, and the switch SW is in an off-state during a CLK cycle in which a comparison process is performed by the comparator 42. Such a configuration can suppress a through-current from flowing between the power source node and the GND node.

Charging of charges to the capacitor C is performed at a timing immediately before the comparison process of each bit. For example, in the drive example of FIG. 9B, the control signal PSW is set to the high level in a period from the time t0 to the time t1, a period from the time t2 to the time t3, a period from the time t4 to the time t5, and a period from the time t6 to the time t7 to perform charging of charges to the capacitor C.

Note that, while the example in which the buffer circuit 44 of the first embodiment is used to form the AD conversion circuit unit 40 has been illustrated in the present embodiment, the buffer circuit 44 of the second or third embodiment may be used to form the AD conversion circuit unit 40.

As described above, according to the present embodiment, a through-current flowing between the power source node and the ground node of the AD conversion circuit can be suppressed, and an increase in power consumption or deterioration of image quality due to the operation of the AD conversion circuit can be suppressed.

Fifth Embodiment

Figure 10:
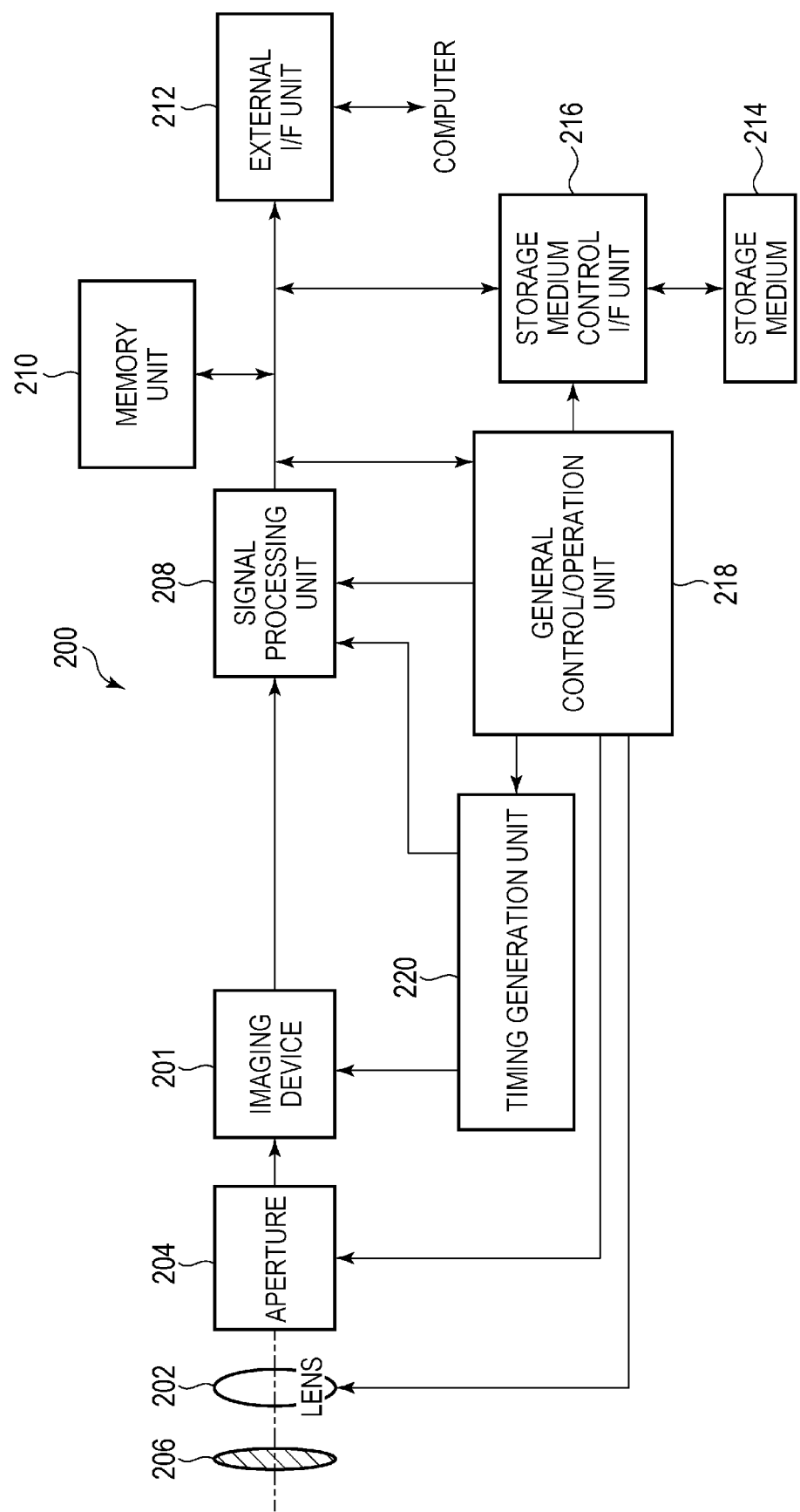
FIG. 10 is a block diagram illustrating a general configuration of an imaging system according to a fifth embodiment.

An imaging system according to a fifth embodiment of the present invention will be described with reference to FIG. 10. The same components as those in the imaging device according to the first to fourth embodiments are labeled with the same reference symbols, and the description thereof will be omitted or simplified. FIG. 10 is a block diagram illustrating a general configuration of the imaging system according to the present embodiment.

The imaging system 200 of the present embodiment includes an imaging device 100 to which the configuration of any of the first to fourth embodiments described above is applied. Specific examples of the imaging system 200 may include a digital still camera, a digital camcorder, a surveillance camera, and the like. FIG. 10 illustrates a configuration example of a digital still camera to which the imaging device 100 described in any of respective embodiments described above is applied.

The imaging system 200 illustrated as an example in FIG. 10 has the imaging device 100, a lens 202 that captures an optical image of a subject onto the imaging device 100, an aperture 204 for changing a light amount passing through the lens 202, and a barrier 206 for protecting the lens 202. The lens 202 and the aperture 204 form an optical system that converges a light onto the imaging device 100.

The imaging system 200 further has a signal processing unit 208 that processes an output signal output from the imaging device 100. The signal processing unit 208 performs a signal processing operation of performing various correction and compression on an input signal for output, if necessary. For example, the signal processing unit 208 applies predetermined image processing such as a conversion process for converting RGB pixel output signals to the Y, Cb, and Cr color space or gamma correction on the input signal.

The imaging system 200 further has a memory unit 210 for temporarily storing image data therein and an external interface unit (external I/F unit) 212 for communicating with an external computer or the like. The imaging system 200 further has a storage medium 214 such as a semiconductor memory for performing storage or readout of imaging data and a storage medium control interface unit (storage medium control I/F unit) 216 for performing storage or readout on the storage medium 214. Note that the storage medium 214 may be embedded in the imaging system 200 or may be removable.

The imaging system 200 further has a general control/operation unit 218 that performs various operations and controls the entire digital still camera and a timing generation unit 220 that outputs various timing signals to the imaging device 100 and the signal processing unit 208. Here, the timing signal or the like may be input from the outside, and the imaging system 200 may have at least the imaging device 100 and the signal processing unit 208 that processes an output signal from the imaging device 100. The general control/operation unit 218 and the timing generation unit 220 may be configured to perform a part or all of the control function of the imaging device 100.

The imaging device 100 outputs an imaging signal to the signal processing unit 208. The signal processing unit 208 performs predetermined signal processing on an imaging signal output from the imaging device 100 and outputs image data. Further, the signal processing unit 208 uses an imaging signal to generate an image. An image generated by the signal processing unit 208 is stored in the storage medium 214, for example. Further, an image generated by the signal processing unit 208 is displayed as a moving image or a static image on a monitor such as a liquid crystal display. The image stored in the storage medium 214 can be hard-copied by a printer or the like.

By using the imaging device of each of the embodiments described above to configure an imaging system, it is possible to realize an imaging system that consumes less power and can acquire a better quality image.

Sixth Embodiment

An imaging system and a movable object according to a sixth embodiment of the present invention will be described by using FIG. 11A and FIG. 11B. FIG. 11A and FIG. 11B are diagrams illustrating a configuration of an imaging system and a movable object according to the present embodiment.

FIG. 11A illustrates an example of an imaging system 300 related to an on-vehicle camera. The imaging system 300 has an imaging device 310. The imaging device 310 is any of the imaging devices 100 described in respective embodiments described above. The imaging system 300 has an image processing unit 312 that performs image processing on a plurality of image data acquired by the imaging device 310 and a parallax acquisition unit 314 that calculates a parallax (a phase difference of parallax images) from the plurality of image data acquired by the imaging device 310. Further, the imaging system 300 has a distance acquisition unit 316 that calculates a distance to the object based on the calculated parallax and a collision determination unit 318 that determines whether or not there is a collision possibility based on the calculated distance. Here, the parallax acquisition unit 314 and the distance acquisition unit 316 are an example of a distance information acquisition unit that acquires distance information on the distance to the object. That is, the distance information is information on a parallax, a defocus amount, a distance to an object, or the like. The collision determination unit 318 may use any of the distance information to determine the collision possibility. The distance information acquisition unit may be implemented by dedicatedly designed hardware or may be implemented by a software module. Further, the distance information acquisition unit may be implemented by a Field Programmable Gate Array (FPGA), an Application Specific Integrated Circuit (ASIC), or the like, or may be implemented by combination thereof.

The imaging system 300 is connected to the vehicle information acquisition device 320 and can acquire vehicle information such as a vehicle speed, a yaw rate, a steering angle, or the like. Further, the imaging system 300 is connected with a control ECU 330, which is a control device that outputs a control signal for causing a vehicle to generate braking force based on a determination result by the collision determination unit 318. That is, the control ECU 330 is an example of a movable object control unit that controls a movable object based on the distance information. Further, the imaging system 300 is connected with an alert device 340 that issues an alert to the driver based on a determination result by the collision determination unit 318. For example, when the collision probability is high as the determination result of the collision determination unit 318, the control ECU 330 performs vehicle control to avoid a collision or reduce damage by applying a brake, pushing back an accelerator, suppressing engine power, or the like. The alert device 340 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 300. FIG. 11B illustrates the imaging system 300 in a case of capturing a front area of a vehicle (a capturing area 350). The vehicle information acquisition device 320 transmits instructions to operate the imaging system 300 to perform capturing an image. A use of the imaging device 100 of each of the embodiments described above allows the imaging system 300 of the present embodiment to further improve the ranging accuracy.

Although the example of control for avoiding a collision to another vehicle has been described, the embodiment is applicable to automatic driving control for following another vehicle, automatic driving control for not going out of a traffic lane, or the like. Furthermore, the imaging system is not limited to a vehicle such as the subject vehicle, and can be applied to a movable object (moving apparatus) such as a ship, an airplane, or an industrial robot, for example. In addition, the imaging system can be widely applied to a device which utilizes object recognition, such as an intelligent transportation system (ITS), without being limited to movable objects.

Modified Embodiments

The present invention is not limited to the above-described embodiments, and various modifications are possible.

For example, an example in which a part of the configuration of any of the embodiments is added to another embodiment or an example in which a part of the configuration of any of the embodiments is replaced with a part of the configuration of another embodiment is one of the embodiments of the present invention.

Further, each circuit configuration of the pixel 12, the AD conversion circuit unit 40, the NAND circuit 52, and the like illustrated in the embodiment described above is an example, and may be changed as appropriate.

Further, in the first to fourth embodiment described above, the NAND circuit 52 or the NOR circuit 53 is used to configure the buffer circuit 44. However, the buffer circuit 44 may be any circuit as long as it can hold, in the capacitor C of the output part of the buffer circuit 44, a voltage whose polarity is opposite to a signal resulted after AD conversion, it is therefore not necessarily required to use the NAND circuit 52 or the NOR circuit 53. The buffer circuit 44 may be configured using other logic circuits, such as an inverter circuit, an AND circuit, or the like, instead of the NAND circuit 52 or the NOR circuit 53.

Further, the imaging systems illustrated in the fifth and sixth embodiments are examples of an imaging system to which the imaging device of the present invention may be applied, and an imaging system to which the imaging device of the present invention can be applied is not limited to the configuration illustrated in FIG. 10, FIG. 11A, and FIG. 11B.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-129127, filed Jun. 30, 2017, which is hereby incorporated by reference herein in its entirety.

What is claimed is:

1. An imaging device comprising:
a pixel that outputs a signal based on charges generated by photoelectric conversion;
a comparator that compares a pixel signal output from the pixel with a reference signal and outputs a signal in accordance with a comparison result;
a buffer circuit that buffers a signal output from the comparator;
a first switch provided at a part between the buffer circuit and a first node supplied with a first power source voltage;
a control circuit that controls the first switch to a non-conductive state in a period in which the comparator performs a comparison operation to compare the pixel signal with the reference signal; and
a second switch provided at a part between the buffer circuit and a second node supplied with a second power source voltage,
wherein the control circuit controls,
when the output of the comparator is at a high level before the comparison operation, the first switch to a non-conductive state and the second switch to a conductive state in a period in which the comparison operation is performed, and
when the output of the comparator is at a low level before the comparison operation, the first switch to a conductive state and the second switch to a non-conductive state in a period in which the comparison operation is performed.

2. The imaging device according to claim 1, wherein the control circuit controls the first switch to a conductive state before the comparison operation and sets an output of the buffer circuit to a level opposite to an output of the comparator obtained before the comparison operation.

3. The imaging device according to claim 1,
wherein the first switch is provided between the buffer circuit and the first node, and
wherein the comparator outputs a low level signal before the comparison operation and, in response to inversion of a magnitude relationship of the pixel signal and the reference signal, outputs a high level signal.

4. The imaging device according to claim 2,
wherein the first switch is provided between the buffer circuit and the first node, and
wherein the comparator outputs a low level signal before the comparison operation and, in response to inversion of a magnitude relationship of the pixel signal and the reference signal, outputs a high level signal.

5. The imaging device according to claim 1,
wherein the first switch is provided between the buffer circuit and the second node, and
wherein the comparator outputs a high level signal before the comparison operation and, in response to inversion of a magnitude relationship of the pixel signal and the reference signal, outputs a low level signal.

6. The imaging device according to claim 2,
wherein the first switch is provided between the buffer circuit and the second node, and
wherein the comparator outputs a high level signal before the comparison operation and, in response to inversion of a magnitude relationship of the pixel signal and the reference signal, outputs a low level signal.

7. The imaging device according to claim 1, wherein the reference signal is a signal whose level increases or decreases from a predetermined value with time elapsing.

8. The imaging device according to claim 2, wherein the reference signal is a signal whose level increases or decreases from a predetermined value with time elapsing.

9. The imaging device according to claim 1, wherein the reference signal is a signal that is an analog signal converted from a reference value supplied from a successive approximation register.

10. The imaging device according to claim 2, wherein the reference signal is a signal that is an analog signal converted from a reference value supplied from a successive approximation register.

11. The imaging device according to claim 1, wherein the buffer circuit includes a NAND circuit.

12. The imaging device according to claim 2, wherein the buffer circuit includes a NAND circuit.

13. An imaging system comprising:
an imaging device including:
a pixel that outputs a signal based on charges generated by photoelectric conversion;
a comparator that compares a pixel signal output from the pixel with a reference signal and outputs a signal in accordance with a comparison result;
a buffer circuit that buffers a signal output from the comparator;
a first switch provided at a part between the buffer circuit and a first node supplied with a first power source voltage;
a control circuit that controls the first switch to a non-conductive state in a period in which the comparator performs a comparison operation to compare the pixel signal with the reference signal; and
a second switch provided at a part between the buffer circuit and a second node supplied with a second power source voltage,
wherein the control circuit controls,
when the output of the comparator is at a high level before the comparison operation, the first switch to a non-conductive state and the second switch to a conductive state in a period in which the comparison operation is performed, and
when the output of the comparator is at a low level before the comparison operation, the first switch to a conductive state and the second switch to a non-conductive state in a period in which the comparison operation is performed; and
a signal processing unit that processes a signal output from the pixel of the imaging device.

14. A movable object comprising:
an imaging device including:
a pixel that outputs a signal based on charges generated by photoelectric conversion;

a comparator that compares a pixel signal output from the pixel with a reference signal and outputs a signal in accordance with a comparison result;

a buffer circuit that buffers a signal output from the comparator;

a first switch provided at a part between the buffer circuit and a first node supplied with a first power source voltage;

a control circuit that controls the first switch to a non-conductive state in a period in which the comparator performs a comparison operation to compare the pixel signal with the reference signal;

a second switch provided at a part between the buffer circuit and a second node supplied with a second power source voltage, wherein the control circuit controls,
- when the output of the comparator is at a high level before the comparison operation, the first switch to a non-conductive state and the second switch to a conductive state in a period in which the comparison operation is performed, and
- when the output of the comparator is at a low level before the comparison operation, the first switch to a conductive state and the second switch to a non-conductive state in a period in which the comparison operation is performed;

a distance information acquisition unit that acquires distance information on a distance to an object, from parallax images based on a signal from the imaging device; and a control unit that controls the movable object based on the distance information.

* * * * *